United States Patent [19]

Ackerman et al.

[11] 4,151,128
[45] Apr. 24, 1979

[54] GRAFT COPOLYMERS BY SUSPENSION PROCESS FOLLOWING EMULSION

[75] Inventors: Alfred J. Ackerman, Mentor, Ohio; Frederick E. Carrock, Paramus, N.J.

[73] Assignee: Mobil Oil Corporation, New York, N.Y.

[21] Appl. No.: 680,654

[22] Filed: Apr. 27, 1976

Related U.S. Application Data

[63] Continuation-in-part of Ser. No. 399,282, Sep. 18, 1973, abandoned, which is a continuation of Ser. No. 748,656, Jul. 30, 1968, abandoned.

[51] Int. Cl.$^2$ .................... C08L 1/26; C08L 9/00
[52] U.S. Cl. .................... 260/17 A; 260/4 R; 260/29.7 EM; 260/29.7 UP; 260/29.7 N; 260/29.7 SQ; 260/29.7 UA; 260/880 R
[58] Field of Search .......... 260/17 R, 17 A, 4, 880 R, 260/29.7 EM, 29.7 UP, 29.7 PT, 29.7 N, 29.7 SQ, 29.7 UA

[56] References Cited

U.S. PATENT DOCUMENTS

| | | | |
|---|---|---|---|
| 3,238,275 | 3/1966 | Calvert | 260/880 |
| 3,288,887 | 11/1966 | Yoshino | 260/880 |
| 3,370,105 | 2/1968 | DeBell et al. | 260/880 |
| 3,436,440 | 4/1969 | Abe et al. | 260/880 |
| 3,448,175 | 6/1969 | Doak et al. | 260/880 |
| 3,465,066 | 9/1969 | Tanaka et al. | 260/880 |
| 3,887,652 | 6/1975 | Carrock et al. | 260/880 |

*Primary Examiner*—J. Ziegler
*Attorney, Agent, or Firm*—Charles A. Huggett; Ronald J. Cier

[57] ABSTRACT

In the process disclosed herein, a latex comprising a diene rubber pregrafted with styrene/acrylonitrile type monomer mixtures, for example, about 5 to 50% by weight styrene/acrylonitrile emulsion-grafted thereon, is added to an aqueous solution of suspending agent. Additional styrene/acrylonitrile type monomers are then added to the dispersion and polymerized onto the suspended rubbery particles with peroxide initiator to produce ABS type polymers containing from about 3 to less than about 30 percent by weight diene rubber.

10 Claims, No Drawings

GRAFT COPOLYMERS BY SUSPENSION PROCESS FOLLOWING EMULSION

This is a continuation-in-part of our application, Ser. No. 399,282, filed Sept. 18, 1973, abandoned which, in turn, is a continuation of application, Ser. No. 748,656, filed July 30, 1968 and now abandoned.

BACKGROUND OF INVENTION

1. Field of the Invention

This invention relates to the preparation of graft copolymers and more particularly to the preparation of graft copolymer of ABS (acrylonitrile-butadiene-styrene) type by a modified suspension process.

2. Description of the Prior Art

ABS resin technology has grown from its original concept which involved blending of styrene-acrylonitrile resin with nitrile rubber to new areas of technology involving graft polymerization wherein the monomers, styrene and acrylonitrile, are copolymerized onto rubber substrates or backbones and such copolymerizations have been accomplished in mass, emulsion, solution or suspension. As reported in the section on ABS Technology in the "Modern Plastics Encyclopedia", 1968, the rubber elastomeric phase can comprise a variety of elastomers and the relationships of the various components which include styrene and acrylonitrile can be controlled to take maximum advantage of a single property or a set of properties.

In today's market there appear ABS interpolymers of various melt flows and impact strengths which can be used to form glossy sheet, extruded pipe and a variety of molded articles requiring the good properties of ABS resins. The present ABS products on the market finding the widest acceptance and commercial demand are those based on latex technology; that is, that technology wherein emulsion polymerization recipes are employed in forming not only the elastomeric component, commonly polybutadienes, but also the final ABS product, thereby requiring various steps in the process and equipment and making these resins somewhat more complex and expensive to prepare than the simple blends of the early ABS art. These modern day ABS products accordingly sell for a premium in view of the complex technology and cost in their manufacture. It is apparent that industry desired processes and/or techniques for manufacture of ABS resins which can reduce either the cost and/or complexity of manufacture while at the same time provide resins which are equivalent in properties and performance.

STATEMENT OF INVENTION

It is an object of this invention to provide a process for the manufacture of graft copolymers by an economical method.

It is another object of this invention to form an aqueous suspension of monomers such as styrene and acrylonitrile with a pregrafted diene latex dispersed therein and to substantially completely polymerize the monomers in the suspension state so that they become grafted onto said dispersed latex.

It is a still further object of this invention to produce ABS resins having unusually good impact strengths.

In accordance with this invention, there is provided a process for preparing a polymer resin which comprises (a) subjecting a stable diene rubber latex to emulsion state graft polymerization with at least 5% and up to an equal amount by weight of vinyl aromatic/alkenyl cyanide monomers in a ratio of about 80/20 to 60/40 in the absence of a suspending agent, (b) introducing a quantity of the resulting pregrafted diene rubber latex into an aqueous solution of a suspending agent in a suspension zone, (c) introducing into said suspension zone a mixture of vinyl aromatic/alkenyl cyanide monomers in a ratio of about 80/20 to 60/40, preferably 75/25 to 65/35 weight percent, (d) polymerizing the vinyl aromatic/alkenyl cyanide monomers in the presence of the dispersed diene rubber particles and a peroxide initiator in the suspension zone, and (e) recovering beads of polymer resin from the suspension zone. The diene rubber latex has a majority of the particles in the range of 0.005 to about 1 micron and contains from 0 to 50 weight percent vinyl aromatic/alkenyl cyanide polymer. Typical alkenyl cyanide monomers are acrylonitrile and methacrylonitrile, while typical vinyl aromatic compounds include styrene, alphamethylstyrene, vinyltoluene and substituted styrenes or mixtures thereof.

The relative order in which the reactants are added to the suspension zone is not critical, that is the monomers can also be added first and then the latex or both simultaneously. The time-temperature cycle best suited for the suspension polymerization is generally in the range of about 60° to 145° C. for a period of about 4 to 10 hours to result in substantially complete polymerization of the monomers.

In the process of this invention, the original ungrafted diene rubber latex can be an emulsion polymerized composition of polybutadiene, SBR, nitrile, or natural rubber latex. The SBR (styrene-butadiene copolymer) latex can contain from 5 to 40 weight percent styrene, while in the case of the nitrile the acrylonitrile content will be 10 to 50 weight percent.

In this invention, a polybutadiene latex is preferably employed as the grafting site. Suitable latices are available commercially containing between 30 and 65 percent solids, having a majority of particles in the size range of 0.005 to 1.0 microns, preferably 0.05 to 0.3 microns. The preparation of the pregrafted latex is accomplished simply by the addition of monomers such as acrylonitrile and styrene to the latex and polymerizing in the emulsion state using only emulsion type polymerization catalysts, thereby forming a pregraft latex. It is preferred in this operation that the ratio of rubber to monomers be 95:5 to 50:50, a more preferable range being 85:15 to 75:25.

It is old in the art, to polymerize butadiene in emulsion to form the ungrafted polybutadiene latex. Various patents have disclosed compositions of matter as well as processes for preparing the polybutadiene latices. Generally butadiene in an aqueous mixture containing an appropriate emulsifier is emulsified and an initiator such as potassium or ammonium persulfate is employed to carry out the polymerization. As indicated, the polymerization can be carried to 30 to 65 percent solids or lower or higher if desired and usually the rubber particle size can be controlled by varying the type and quantity of emulsifier, agitation, ultimate conversion and polymerization rate. By proceeding in this manner one can obtain either small particle size rubber such as that wherein the majority is about 0.005 to 0.15 microns or larger particle size such as 0.15 to 0.8 microns. The desired pregrafted diene rubber latices can be prepared by following the general procedure described below.

An alkali metal fatty acid soap such as potassium oleate as an emulisifer, ammonium persulfate as a catalyst, a mercaptan to control molecular weight, a small quantity of a base such as potassium hydroxide with or without a buffer (sodium phosphate) to maintain the pH sufficient to prevent formation of free fatty acid, and butadiene are mixed together with water. The reaction is classed as a "hot" polymerization recipe as distinguished from a "cold" polymerization recipe which employs a different catalyst system which is usually hydrogen peroxide plus ferrous ions. The "hot" polymerization is carried out at about 50° C. with agitation for about 10 to 20 hours to yield a latex with 60 to 90 percent or greater of the butadiene converted to rubber. In this case the unreacted butadiene can be flashed or stripped off by a variety of conventional means.

In the above "hot" polymerization reaction additional soap can be added during or after the polymerization to further stabilize the rubber particles.

AS indiated above, the ungrafted polybutadiene latex contains an appropriate emulsifier before it is pregrafted. However, additional soap may be required during the emulsion stage graft polymerization step or "pregraft" to prevent the tendency for the rubber particles to coalesce. This tendency is especially prevalent in the case of the ungrafted polybutadiene latex having the larger particle size.

Any of the prior art emulsifiers can be used in the preparation of the pregrafted latices employed in the process of this invention. Typical examples of the emulsifying agents include the ionic soaps and other surfactants such as sodium oleate, potassium oleate, sodium laurate, sodium stearate, sodium lauryl sulfate, potassium stearate, dodecylbenzene sodium sulfonate, and sodium alkyl-arylpolyether sulfonates; and the nonionic agents such as polyethylene glycol ethers. Other suitable emulsifying agents can be found by referring to U.S. Pat. No. 2,537,644.

In the above "hot" polymerization recipes, cationic soaps such as dodecylamine hydrochloride can be used but in this case the pH is maintained below 7 by the use of water soluble acids. The non-ionic soaps may be used over any desired pH range.

Generally to the latex prepared as indicated above there is added the monomers acrylonitrile and styrene to form the pregrafted latex. Additional water can be added if desired to reduce the concentration of the solids. The monomers can be added directly to the emulsion all at once, incrementally or continuously during polymerization.

To illustrate this procedure, additional catalyst if desired such as potassium persulfate and the desired amount of pregrafting monomers are added to the required amount of ungrafted latex. Polymerization is carried out at about 50° to 80° C., preferably 60°–70° C., for about three to six hours to obtain essentially complete conversion.

Additional emulsifiers and/or buffers can be added to improve and maintain the latex stability. Obviously, suspending agents are avoided for the same reason.

PREFERRED EMBODIMENTS

It is preferred according to this invention to employ as the monomeric grafting constitutents styrene and acrylonitrile although equivalents of these can obviously be employed. Further it is preferred that in the pregrafting step the amount of styrene/acrylonitrile ranges from 25 to 15 percent by weight with the remaining 75 to 85 percent by weight being the diene which will be a polybutadiene according to the preferred embodiment of this invention. The ratio of styrene to acrylonitrile desired is a mixture of 75:25 to 65:35. This ratio, however, is not necessarily fixed and can vary from 80:20 to 60:40 for the ultimate composition as well as for the pregrafted latex.

The initiators used in the suspension grafting stage are those well known in the art such as tertiary butyl perbenzoate and di-t-butyl perixode, dibenzoyl peroxide, t-butyl peracetate, t-butylperoxy isopropyl carbonate and mixtures for use in the suspension polymerization process while potassium persulfate or ammonium persulfate or redox systems based on hydrogen peroxide or organic hydroperoxides are those used for the initial latex or emulsion polymerization grafting step. It should be realized that this invention involves two separate graft polymerizations, namely an emulsion method followed by a suspension method, the emulsion method being employed to prepare the polybutadiene as well as the pregrafted polybutadiene while the suspension method is employed to finish the polymerization grafting of styrene/acrylonitrile thereby forming the ABS resin.

The suspension polymerization is carried out by employing a suspending agent such as hydroxyethylcellulose or any other suitable material such as polyvinyl alcohol, carboxymethyl cellulose sodium salt, acrylic acid copolymers, tricalcium phosphate, talc, bentonite and the like. The polymerization is carried out in a separate suspension vessel using an initiator (or initiator pair) such as t-butyl perbenzoate at temperatures of from 100° to 150° C. In the suspension step a sufficient quantity of pregrafted latex is added so that the ultimate rubber content, that is rubbery diene content of the final ABS will range from 3 to less than 30 percent, preferably 10 to less than 30 percent. The suspension polymerization preferably is completed after a polymerization cycle of six hours at 105° to 130° C. The ABS beads are then recovered from the suspension vessel having a size generally in the range of about 10 to 150 mesh.

In the Examples presented hereinafter when reference is made to the tests indicated below, the following ASTM designations are understood unless otherwise specified.

| Properties | ASTM | Units | Test Conditions |
|---|---|---|---|
| Melt Flow | D-1238-62T | Grams/10 min. | 230° C./5000 gram weight |
| Izod Impact | D-256 | Ft.-Lbs/In. Notch | Injection molded samples ½" by ½" by 2½" molded according to ASTM D-647 |
| Tensile Yield | D-638-64T | PSI | Tensile specimens prepared as per ASTM D-638 |
| Tensile Fail | | PSI. | |
| Elongation | D-638-64T | % | |
| Rockwell Hardness, R Scale | D-785-62 | — | |

EXAMPLE 1

This example illustrates the initial emulsion grafting stage used in the process of this invention.

A polybutadiene latex having a relatively large rubber particle size (averaged about 0.25 microns) was filtered and added to a vessel equipped with an agitator, nitrogen inlet, vent heating and cooling means, and temperature and pressure indicators. The agitator was then started at a low speed (50 rpm) in order to minimized foaming. Demineralized water was metered into the vessel and a soap (sodium alkyl-arylpolyether sulfonate) was added. A monomer mix consisting of styrene/acrylonitrile (in a 72/28 ratio) and a modifier (t-dodecyl mercaptan) was weighed, mixed and nitrogen purged.

As one of the operating methods (Method A) herein, the required monomer mix was slowly charged to the reactor, the vessel was then closed and the resulting mixture was agitated for one-half hour. The initiator (ammonium persulfate) was then added to the reactor, the contents were purged with nitrogen and a pressure of nitrogen (5 psig) maintained on the vessel. The vessel was the heated to the polymerization temperature of 65° C. (149° F.) and maintained for a period of time (about 2½ hours). Samples were taken at intervals as a check until the target solids was reached, usually in the range about 38-48 weight percent.

In another of the operating methods (Method B) herein, half of the required monomer mix was slowly charged to the reactor. The other procedures of Method A described in the preceding paragraph were the same except that in this method the remaining half of the monomer mix was added after one hour of polymerization. In still another of the operating methods (Method C) herein, the monomer mix was continuously added throughout the entire pregrafting operation. In all cases suspending agents are avoided during this emulsion grafting stage.

EXAMPLE 2

This example illustrates one embodiment of the process of the present invention which employs a pregrafted polybutadiene latex having a ratio of 80 percent polybutadiene to 20 percent styrene/acrylonitrile prepared by Method A described under Example 1 with the following charge:

|  | Grams |
|---|---|
| Latex (about 58% total solids) | 1140 |
| Styrene | 108 |
| Acrylonitrile | 42 |
| Demineralized Water | 360 |
| "Triton X-200" | 105 |
| (a soap containing 28% total solids) |  |
| Ammonium Persulfate | 0.75 |
| (0.5% based on Styrene and Acrylonitrile) |  |
| t-dodecyl mercaptan | 0.3 |
| (0.2% based on Styrene and Acrylonitrile) |  |
| The charge was pregrafted at the following cycle: |  |
| Temperature | 65° C. |
| Time | 4 hours |
| Final total solids content | 47% |

With the agitator at 500 rpm, demineralized water ws metered into a vessel (2 liter) equipped with a nitrogen inlet, vent heating and cooling means, and temperature and pressure indicators. The amount of water was determined by the desired ratio of total water to total polymer, (about 2/1 in this case). A suspending agent such as hydroxyethylcellulose was then sifted into the vessel (about 0.5 percent based on the total water in this case). The trisodium salt of ethylenediaminetetraacetic acid (EDTA-Na$_3$), about 0.2% based on total polymer, was added to the vessel for melt flow control. A monomer mixture consisting of: styrene and acrylonitrile (72/28 weight ratio in this case); modifier (t-dodecyl mercaptan), 0.20 percent based on the total polymer in this case; lubricant (mineral oil, 0.8 percent based on total polymer in this case); an antioxidant such as tris-nonylphenyl phosphite, "Polygard HR", 0.2 percent based on total polymer; initiators, t-butyl perbenzoate, 0.15 percent and di-t-butyl peroxide, 0.025 percent in this case both based on polymer, were weighed, mixed, and added to the reactor.

The following temperature cycle was then followed:

| Time, hours | 1 | 3 | 1.5 | 1 |
|---|---|---|---|---|
| Temperature, °C. | 100 | 105 | 115 | 130 |

The resulting copolymer was removed from the cooled reactor, filtered, washed with water and dried at 60°-70° C. in an air oven. The dried polymer was blended on a hot roll mill with small amounts of an additional antioxidant (0.25 percent of 1,3,5-trimethyl - 2,4, 6-tri(3, 5 di-t-butyl-4 - hydroxybenzyl) benzene, and a processing aid (0.15 percent calcium stearate). The copolymer was then injection molded for testing.

The following Table I indicates the charge for the suspension polymerization step for runs 1-4 and the physical properties of the resulting copolymers which all contained about 19 weight percent rubber and shows the effect of mercaptan concentration in the suspension polymerization.

TABLE I

| Run Number | 1 | 2 | 3 | 4 |
|---|---|---|---|---|
| Charge |  |  |  |  |
| Pregrafted Latex, grams | 174 | 174 | 174 | 174 |
| Styrene, grams | 180 | 180 | 180 | 180 |
| Acrylonitrile, grams | 70 | 70 | 70 | 70 |
| Demineralized water, grams | 600 | 600 | 600 | 600 |
| "Natrosol 250HR", grams (hydroxyethylcellulose) | 3.6 | 3.6 | 3.6 | 3.6 |
| EDTA- Na$_3$, grams | 0.6 | 0.6 | 0.6 | 0.6 |
| t-butyl perbenzoate, grams | 0.47 | 0.47 | 0.47 | 0.47 |
| di-t-butyl peroxide, grams | 0.08 | 0.08 | 0.08 | 0.08 |
| "Polygard HR", grams | 0.63 | 0.63 | 0.63 | 0.63 |
| "Primol 355", grams (mineral oil) | 2.5 | 2.5 | 2.5 | 2.5 |
| t-dodecyl mercaptan (t-DDM), grams | 0.47 | 0.71 | 0.94 | 1.29 |
| (% t-DDM based on polymer) | (0.15) | (0.22) | (0.30) | (0.40) |
| Physical Properties |  |  |  |  |
| Melt Flow, grams/10 min. | 0.6 | 1.4 | 3.5 | 7.9 |
| Izod Impact, ft.-lbs./in. | 10.0 | 8.3 | 8.5 | 5.3 |
| Rockwell Hardness, R Scale | 88 | 90 | 91 | 90 |

EXAMPLE 3

This example illustrates other embodiment of the process of this invention which employs a pregrafted polybutadiene latex having a ratio of 80 percent polybutadiene to 20 percent styrene/acrylonitrile prepared by Method A described under Example 1, except that the original ungrafted polybutadiene latex had a relatively small particle size (averaged about 0.1 micron), with the following charge:

|  | Grams |
|---|---|
| Latex (about 44% total solids) | 1500 |
| Styrene | 108 |
| Acrylonitrile | 42 |
| Demineralized Water | 70 |
| Ammonium Persulfate | 0.75 |
| (0.5% based on Styrene and Acrylonitrile) | |
| t-dodecyl mercaptan | 0.3 |
| (0.2% based on Styrene and Acrylonitrile) | |
| The charge was pregrafted at the following cycle: | |
| Temperature | 65° C. |
| Time | 4 hours |
| Final total solids content | 47% |

The same suspension polymerization procedure was used in the second stage of this example as was used in Example 2. Table II below indicates the charge for the suspension polymerization step for runs 5–8 and the physical properties of the resulting copolymers which all contained about 19 weight percent rubber and shows the effect of mercaptan concentration.

TABLE II

| Run Number | 5 | 6 | 7 | 8 |
|---|---|---|---|---|
| Charge | | | | |
| Pregrafted Latex, grams | 174 | 174 | 174 | 174 |
| Styrene, grams | 180 | 180 | 180 | 180 |
| Acrylonitrile, grams | 70 | 70 | 70 | 70 |
| Demineralized water, grams | 600 | 600 | 600 | 600 |
| "Natrosol 250HR", grams | 3.6 | 3.6 | 3.6 | 3.6 |
| EDTA - Na$_3$, grams | 0.6 | 0.6 | 0.6 | 0.6 |
| t-butyl perbenzoate, grams | 0.47 | 0.47 | 0.47 | 0.47 |
| di-t-butyl peroxide, grams | 0.08 | 0.08 | 0.08 | 0.08 |
| "Polygard HR", grams | 0.63 | 0.63 | 0.63 | 0.63 |
| "Primol 355", grams | 2.5 | 2.5 | 2.5 | 2.5 |
| t-dodecyl mercaptan, grams | 0.49 | 0.71 | 0.94 | 1.29 |
| (% t-DDM based on polymer) | (0.15) | (0.22) | (0.30) | (0.40) |
| Physical Properties | | | | |
| Melt Flow, grams/10 min. | 0.3 | 0.7 | 1.5 | 3.1 |
| Izod Impact, ft.-lbs./in. | 9.9 | 7.4 | 7.2 | 4.8 |
| Rockwell Hardness, R-Scale | 94 | 96 | 93 | 93 |

EXAMPLE 4

This example illustrates the preparation of an ABS having about the same rubber content using the ungrafted polybutadiene latex of Example 3 directly in a suspension grafting process. In other words, the emulsion pregrafting stage of Example 3 is omitted and, in a pilot plant vessel (100 gals.), the following temperature cycle and charge were used:

| Time, hours, | 2 | 4.5 | 1.5 | 1.5 |
|---|---|---|---|---|
| Temperature, ° C. | 70–105 | 105 | 115 | 130 |

Table III below shows the charge for the suspension polymerization step for this example and the physical properties of the resulting ABS resin containing about 19 weight percent rubber.

TABLE III

| Charge | |
|---|---|
| Ungrafted Latex, lbs. | 88.7 |
| Styrene, lbs. | 116 |
| Acrylontrile, lbs. | 45.1 |
| Demineralized water, lbs. | 394 |
| "Natrosol 250 HR", lbs. | 1.97 |
| EDTA - Na$_3$, lbs. | 0.66 |

TABLE III-continued

| t-butyl perbenzoate, lbs. | 0.29 |
|---|---|
| "Polygard HR", lbs. | 0.66 |
| "Ionol"*, lbs. | 0.17 |
| "Primol 355", lbs. | 1.65 |
| t-dodecyl mercaptan, lbs. | 0.87 |
| Physical Properties | |
| Melt Flow, grams/10 min. | 6.5 |
| Izod Impact, ft.-lbs./in. | 3.5 |
| Rockwell Hardness, R Scale | 81 |
| Tensile Yield, PSI | 4320 |
| Tensile Fail, PSI | 3460 |
| Elongation at fail, % | 10 |

*2,6-di-t-butyl-4 methyl-phenol

EXAMPLE 5

This example illustrates the use of a pregrafted polybutadiene latex having a ratio of 65 percent polybutadiene to 35 percent styrene/acrylonitrile prepared by Method B described under Example 1 with the folowing charge:

|  | Grams |
|---|---|
| Latex (about 58% total solids) | 759 |
| Styrene | 154.8 |
| Acrylonitrile | 60.2 |
| Demineralized Water | 496 |
| "Tritoin X-200" | 105 |
| (a soap containing 28% total solids) | |
| Ammonium Persulfate | 1.0 |
| (0.5% based on Styrene and Acrylonitrile) | |
| The charge was pregrafted at the following cycle: | |
| Temperature | 65° C. |
| Time | 4.5 Hours |
| Final total solids content | 43.1% |

The same suspension polymerization procedure was used in this example as was used in Example 2. Table IV below indicates the charge for the suspension polymerization step for runs 9–12 and the physical properties of the resulting copolymers containing about 19 weight percent rubber and shows the effect of mercaptan concentration on the copolymer properties.

TABLE IV

| Run Number | 9 | 10 | 11 | 12 |
|---|---|---|---|---|
| Charge | | | | |
| Pregrafted Latex, grams | 208 | 208 | 208 | 208 |
| Styrene, grams | 156.2 | 156.2 | 156.2 | 156.2 |
| Acrylonitrile, grams | 60.8 | 60.8 | 60.8 | 60.8 |
| Demineralized water, grams | 600 | 600 | 600 | 600 |
| "Natrosol 250 HR", grams | 3.0 | 3.0 | 3.0 | 3.0 |
| EDTA - Na$_3$, grams | 0.6 | 0.6 | 0.6 | 0.6 |
| t-butyl perbenzoate, grams | 0.45 | 0.45 | 0.45 | 0.45 |
| di-t-butyl peroxide, grams | 0.08 | 0.08 | 0.08 | 0.08 |
| "Polygard HR", grams | 0.6 | 0.6 | 0.6 | 0.6 |
| "Primol 355", grams | 2.5 | 2.5 | 2.5 | 2.5 |
| t-dodecyl mercaptan, grams | 0.49 | 0.71 | 0.94 | 1.29 |
| (% t-DDM based on polymer) | (0.15) | (0.22) | (0.30) | (0.40) |
| Physical Properties | | | | |
| Melt Flow, grams/10 min. | 0.4 | 1.1 | 3.0 | 7.2 |
| Izod Impact, ft.-lbs./in. | 8.4 | 8.6 | 7.1 | 6.6 |
| Rockwell Hardness, R Scale | 94 | 96 | 93 | 96 |

EXAMPLE 6

This example illustrates the effect that rubber content has on the physical properties of the ABS resin prepared in accordance with the process of this invention. In this example a pregrafted polybutadiene latex having a ratio of 80 percent polybutadiene to 20 percent sytrene/acrylonitrile prepared by a method similar to Method C described under Example 1 except that a pilot plant vessel (100 gals.) was used for the following charge:

|  | Lbs. |
|---|---|
| Latex | 400 |
| Styrene | 40.7 |
| Acrylonitrile | 15.8 |
| Demineralized Water | 260 |
| "Triton X-200" (a soap containing 28% total solids) | 46.3 |
| Ammonium Persulfate (0.5% based on Styrene and Acrylonitrile) | 0.28 |
| t-dodecyl mercaptan (0.2% based on Styrene and Acrylonitrile) | 0.12 |
| sodium bicarbonate | 3.3 |
| The charge was pregrafted at the following cycle: | |
| Temperature | 65° C. |
| Time | 6 hours |
| Final total solids content | 38.2% |

About the same suspension polymerization step was used in this example as described in Example 2 except that a pilot plant vessel (100 gals.) and the following temperature cycles were employed:

| Time, hours | 2 | 4.5 | 1.5 | 1.5 |
|---|---|---|---|---|
| Temperature, °C. | 70-105 | 105 | 115 | 130 |

The following Table V indicates the charge for the suspension polymerization step for runs 13-15 and the physical properties of the resulting ABS and shows the effect an increase in the rubber latex content has on the ABS resins produced in accordance with the present invention.

TABLE V

| Run Number | 13 | 14 | 15 |
|---|---|---|---|
| Charge | | | |
| Pregrafted Latex, lbs. | 97.2 | 114.3 | 113 |
| (% rubber based on final ABS composition) | (14) | (16) | (18) |
| Styrene, lbs. | 116.0 | 116.0 | 116.0 |
| Acrylonitrile, lbs. | 45.1 | 45.1 | 45.1 |
| Demineralized water, lbs. | 380 | 385 | 390 |
| "Natrosol 250 HR", lbs. | 1.92 | 1.92 | 1.92 |
| EDTA - Na3, lbs. | 0.66 | 0.66 | 0.66 |
| t-butyl perbenzoate, lbs. | 0.30 | 0.30 | 0.30 |
| "Polygard HR", lbs. | 0.66 | 0.66 | 0.66 |
| "Inonol", lbs. | 0.17 | 0.17 | 0.17 |
| "Primol 355", lbs. | 1.65 | 1.65 | 1.65 |
| t-dodecyl mercaptan, lbs. | 0.41 | 0.49 | 0.49 |
| (% t-DDM based on polymer) | (0.2) | (0.25) | (0.25) |
| Physical Properties | | | |
| Melt Flow, grams/10 min. | 3.0 | 3.2 | 2.8 |
| Izod Impact, ft.-lbs./in. | 5.0 | 5.9 | 6.8 |
| Rockwell Hardness, R-Scale | 100 | 97 | 91 |
| Tensile Yield, PSI | 5350 | 5100 | 4640 |
| Tensile Fail, PSI | 4570 | 4380 | 3950 |
| Elongation at fail, % | 27 | 26 | 18 |

Resort can be had to modifications and equivalents falling within the spirit of this invention and the scope of the claims thereof.

What is claimed is:

1. A process for preparing a rubber based graft copolymer with enhanced impact strength comprising:
    (a) subjecting a stable, water-based emulsion type diene rubber latex to emulsion state graft polymerization in the absence of suspending agents with at least 5% and up to an equal amount by weight based upon said diene rubber of a mixture of vinyl aromatic/alkenyl cyanide monomers in a weight ratio of between about 80/20 and 60/40 in the presence of polymerization catalysts of the emulsion polymerization type and sufficient emulsifying agents to maintain the stable emulsion state,
    (b) combining the emulsion grafted latex thus produced in step (a) with sufficient suspending agent to convert same to the discrete suspension state,
    (c) introducing into the suspension thus formed in step (b) additional vinyl aromatic/alkenyl cyanide monomers in a weight ratio between about 80/20 and 60/40 as well as an organic peroxide initiator of the type effective for catalyzing suspension state graft polymerization of said monomers,
    (d) effecting suspension state graft polymerization of the additional monomers introduced in step (c) until a final graft copolymer is formed containing by weight a total of between 70 and 97% of said vinyl aromatic/alkenyl cyanide constituents, and
    (e) recovering said final graft copolymer directly from step (d) in the form of beads.

2. The process of claim 1 wherein the majority of the original diene rubber latex particles are in the range of 0.05 to 0.3 micron.

3. The process of claim 1 wherein the weight ratio of said monomers in each case is between 75/25 and 65/35 with the aromatic monomer being styrene and the alkenyl cyanide monomer being acrylonitrile.

4. The process of claim 3 wherein the original diene rubber is essentially polybutadiene and the amount of monomers reacted therewith in step (a) is sufficient to produce an emulsion grafted latex containing between about 75 and 85% polybutadiene by weight and the amount of monomer mixture reacted in step (d) is controlled to produce a final graft copolymer containing between 10 and 30 percent by weight of polybutadiene.

5. A process for preparing a rubber based graft acrylonitrile-butadiene-styrene polymer with superior impact strength comprising:
    (a) subjecting a stable, water-based emulsion type polybutadiene latex having a particle size range between about 0.005 and 1 micron to emulsion state graft polymerization in the absence of suspending agents with at least 5% and up to an equal amount by weight based upon said polybutadiene of a mixture of styrene/acrylonitrile monomers in a weight ratio of between about 80/20 and about 60/40 in the presence of polymerization catalysts of the emulsion polymerization type and sufficient emulsifying agents to maintain the stable emulsion state,
    (b) combining the emulsion grafted latex thus produced in step (a) with sufficient suspending agent to convert same to the discrete suspension state,
    (c) introducing into the suspension thus formed in step (b) additional styrene/acrylonitrile monomers in a weight ratio between 80/20 and 60/40 as well as an organic peroxide initiator of the type effective for catalyzing suspension state graft polymerization of said monomers,
    (d) effecting suspension state graft polymerization of the additional monomers introduced in step (c) until a final graft copolymer is formed containing by weight a total of between 70 and 97% of said styrene/acrylonitrile constituents, and (e) recovering said final graft copolymer directly from step (d) in the form of beads.

6. The process of claim 5 wherein the majority of the original polybutadiene latex particles are in the range of 0.05 to 0.3 micron.

7. The process of claim 5 wherein the weight ratio of styrene/acrylonitrile monomers in each case is between 75/25 and 65/35.

8. The process of claim 7 wherein the amount of monomers reacted in step (a) is controlled to produce an emulsion grafted latex containing between about 75 and about 85% polybutadiene by weight and the amount of monomers reacted in step (d) is controlled to produce a final graft acrylonitrile-butadiene-styrene polymer containing between 10 and 30% by weight of polybutadiene.

9. The process of claim 5 wherein the polymerization catalyst used in the emulsion grafting step (a) is an inorganic persulfate.

10. The process of claim 5 wherein hydroxyethylcellulose is used as the suspending agent in step (b).

* * * * *

UNITED STATES PATENT AND TRADEMARK OFFICE
CERTIFICATE OF CORRECTION

PATENT NO. : 4,151,128
DATED : April 24, 1979
INVENTOR(S) : ALFRED J. ACKERMAN and FREDERICK E. CARROCK It is certified that error appears in the above-identified patent and that said Letters Patent are hereby corrected as shown below:

| | | |
|---|---|---|
| Title | — | "GRAFT COPOLYMERS BY SUSPENSION PROCESS FOLLOWING EMULSION" should be --GRAFT COPOLYMERS BY SUSPENSION PROCESS FOLLOWING EMULSION PREGRAFT-- |
| Column 1, Line 47 | — | "desired" should be --desires--. |
| Column 3, Line 18 | — | "AS indiated" should be --As indicated--. |
| Column 4, Line 21 | — | "perixode" should be --peroxide--. |
| Column 5, Line 24 | — | "was the heated" should be --was then heated--. |
| Column 5, Line 66 | — | "water ws" should be --water was--. |

Signed and Sealed this

Sixteenth Day of October 1979

[SEAL]

Attest:

RUTH C. MASON
Attesting Officer

LUTRELLE F. PARKER
Acting Commissioner of Patents and Trademarks